(12) United States Patent
Kobayashi et al.

(10) Patent No.: US 7,667,803 B2
(45) Date of Patent: Feb. 23, 2010

(54) LIQUID CRYSTAL DISPLAY DEVICE

(75) Inventors: Setsuo Kobayashi, Mobara (JP); Yoshihiro Arai, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 150 days.

(21) Appl. No.: 11/851,414

(22) Filed: Sep. 7, 2007

(65) Prior Publication Data

US 2008/0062360 A1 Mar. 13, 2008

(30) Foreign Application Priority Data

Sep. 8, 2006 (JP) ............................... 2006-243534

(51) Int. Cl.
G02F 1/1333 (2006.01)
(52) U.S. Cl. ........................................ 349/122; 347/45
(58) Field of Classification Search .................. 349/56, 349/84, 139, 149, 152
See application file for complete search history.

(56) References Cited

U.S. PATENT DOCUMENTS

| | | | | |
|---|---|---|---|---|
| 4,267,208 A | * | 5/1981 | Ireland | 427/154 |
| 4,775,225 A | * | 10/1988 | Tsuboyama et al. | 349/155 |
| 5,243,202 A | * | 9/1993 | Mori et al. | 257/59 |
| 5,268,783 A | * | 12/1993 | Yoshinaga et al. | 349/88 |
| 5,327,271 A | * | 7/1994 | Takeuchi et al. | 349/88 |
| 5,475,515 A | * | 12/1995 | Yoshinaga et al. | 349/89 |
| 5,512,336 A | * | 4/1996 | Yamahara | 428/1.2 |
| 5,583,679 A | * | 12/1996 | Ito et al. | 349/118 |
| 5,666,178 A | * | 9/1997 | Hirata et al. | 349/136 |
| 5,667,854 A | * | 9/1997 | Yamada | 428/1.31 |
| 5,796,458 A | * | 8/1998 | Koike et al. | 349/126 |
| 5,812,227 A | * | 9/1998 | Toshida et al. | 349/88 |
| 5,844,649 A | * | 12/1998 | Yamahara et al. | 349/118 |
| 6,066,357 A | * | 5/2000 | Tang et al. | 427/66 |
| 6,084,651 A | * | 7/2000 | Yamahara et al. | 349/118 |
| 6,195,147 B1 | * | 2/2001 | Asao et al. | 349/133 |
| 6,576,319 B2 | * | 6/2003 | Yoshinari et al. | 428/64.1 |
| 6,650,387 B1 | * | 11/2003 | Asao et al. | 349/133 |
| 6,764,187 B2 | * | 7/2004 | Ryutov et al. | 359/846 |
| 7,055,162 B2 | * | 5/2006 | Komaki et al. | 720/724 |
| 7,245,340 B2 | * | 7/2007 | Yamahara | 349/118 |
| 7,499,136 B2 | * | 3/2009 | Kubo | 349/139 |
| 2002/0171801 A1 | * | 11/2002 | Hsieh et al. | 349/187 |
| 2004/0086680 A1 | * | 5/2004 | Decre | 428/64.4 |
| 2004/0125328 A1 | * | 7/2004 | Chae et al. | 349/187 |
| 2004/0131861 A1 | * | 7/2004 | Chae et al. | 428/411.1 |

(Continued)

FOREIGN PATENT DOCUMENTS

JP 60241236 A * 11/1985

(Continued)

*Primary Examiner*—Frank G Font
*Assistant Examiner*—Peter Radkowski
(74) *Attorney, Agent, or Firm*—Antonelli, Terry, Stout & Kraus, LLP.

(57) ABSTRACT

In a liquid crystal display device including an orientation film and a seal material, at a terminal connection portion where one substrate extends outward from another substrate, a step portion of an organic insulating film is formed on an inner side of the seal material to dispose a step, whereby spreading of the orientation film from the step portion to the seal material is limited. Lead wires that electrically interconnect connection terminals and pixel portions are formed on a portion of the organic insulating film where the film thickness is thin.

10 Claims, 13 Drawing Sheets

U.S. PATENT DOCUMENTS

| | | |
|---|---|---|
| 2004/0145692 A1 * | 7/2004 | Yamazaki et al. ............ 349/123 |
| 2004/0169805 A1 * | 9/2004 | Yun et al. .................... 349/124 |
| 2004/0233377 A1 * | 11/2004 | Utsumi et al. ................ 349/155 |
| 2005/0179360 A1 * | 8/2005 | Okamoto et al. ............. 313/495 |
| 2006/0017775 A1 * | 1/2006 | Li et al. ......................... 347/45 |
| 2006/0159838 A1 * | 7/2006 | Kowalski et al. ............... 427/58 |
| 2006/0187400 A1 * | 8/2006 | Chae et al. ................... 349/155 |

FOREIGN PATENT DOCUMENTS

| | | | |
|---|---|---|---|
| JP | 63090031 A | * | 4/1988 |
| JP | 2000204250 A | * | 7/2000 |
| JP | 2000272128 A | * | 10/2000 |
| JP | 2001337316 A | * | 12/2001 |
| JP | 2003279999 A | * | 10/2003 |
| JP | 2003295195 A | * | 10/2003 |
| JP | 2004-361623 | | 12/2004 |
| JP | 2004361623 A | * | 12/2004 |
| JP | 2005121739 A | * | 5/2005 |
| JP | 2008060426 A | * | 3/2008 |

* cited by examiner

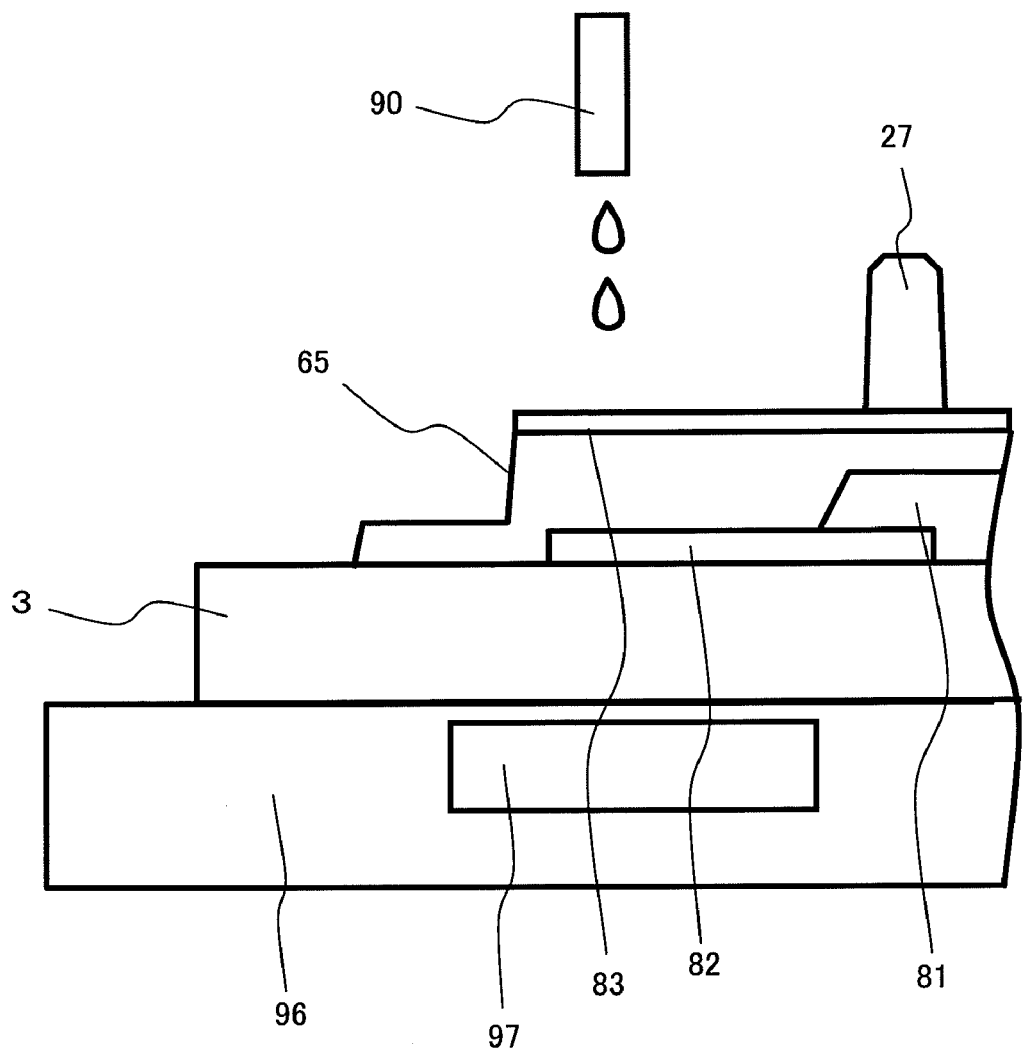

LIQUID CRYSTAL DISPLAY DEVICE

BACKGROUND OF THE INVENTION

1. Field of the Invention

The present invention relates to a liquid crystal display device and in particular to technology effectively applied to a liquid crystal display device using an orientation film.

2. Background Art

In recent years, liquid crystal display devices have been heavily used as display devices. In particular, liquid crystal display devices have been used as display units in large televisions and portable devices because they are thin, lightweight, and low power consumption.

However, liquid crystal display devices require an orientation film because they use a liquid crystal composition. Further, liquid crystal display devices have a structure where the liquid crystal composition is sealed between two substrates. For that reason, a seal material that seals the liquid crystal composition is disposed around the substrates. Further, the orientation film and the seal material are disposed in proximity to each other because of the demand to narrow the bezel portion.

In recent years, methods of applying the orientation film to the substrates by the inkjet method have been developed. When the inkjet method is used, direct drawing can be done, and there are effects such as low contamination because of the non-contact process, a reduction in the consumed amount of solution, and a shortening of the setup time.

In regard to a liquid crystal display device where the orientation film is formed by the inkjet method, there is description in JP-A-2004-361623. However, JP-A-2004-361623 stops at disclosing forming a dike-like structure to control the shape of the orientation film.

SUMMARY OF THE INVENTION

It has been pointed out that it is difficult to control the dimensions and shape of the periphery of an orientation film formed by the inkjet method. That is, the reason is because the material emitted by the inkjet method has a low solid content density and a low viscosity.

Thus, the resin liquid used in the inkjet method has a low viscosity and a large quantity of solvent, so after it is applied, the periphery thereof spreads with respect to the application position, for example. Additionally, this spreading is not often uniform across the entire region around the resin film, and a spatially wasteful region is unavoidably formed.

The present invention has been made on the basis of such circumstances, and it is an object thereof to provide a liquid crystal display device disposed with an orientation film where there is no spreading at its periphery.

A liquid crystal display device including a first substrate and a second substrate, the liquid crystal display device comprising: a display region disposed in the first substrate; a seal material disposed around the display region; a organic insulating film formed on the first substrate or the second substrate; and an orientation film formed on the organic insulating film, wherein a step portion is formed on an inner side of the organic insulating film partitioned by the seal material.

Further, a film whose affinity with the orientation film is low in comparison to the organic insulating film is disposed on the step portion.

Further, the viscosity of the orientation film is adjusted to become higher and limit spreading of the orientation film when the orientation film is dripped in the vicinity of the step portion.

In the present invention, the orientation film is formed on an inner side of the seal material at a side portion contributing to making the bezel narrow in a structure where an orientation film is formed in proximity to a seal material in a liquid crystal display device.

Further, the present invention controls as much as possible an increase in the manufacturing steps and limits application of the orientation film as far as the formation portion of the seal material in a structure where an orientation film is formed in proximity to a seal material in a liquid crystal display device.

According to the present invention, it becomes possible to obtain a liquid crystal display device where the formation region of the seal material and the orientation film are brought into proximity with each other and the display portion periphery is narrowly formed.

According to the present invention, it is possible to easily limit application of the orientation film in the formation region of the seal material, and it becomes possible to obtain a liquid crystal display device whose display region is wide in comparison to its peripheral portion by adding a half-exposure step or adjusting the viscosity of the orientation film.

Further, a liquid crystal display device including a liquid display panel, wherein the liquid crystal panel includes first substrate and second substrate, the first and second substrate oppose each other with a liquid crystal layer being interposed therebetween, a seal material is disposed around the superposed two substrates so as to seal a liquid crystal composition, a protective film is formed on the liquid crystal layer side of the two substrates, an orientation film is formed on the protective film, and a step portion of the protective film is formed in the vicinity of a position where the seal material of at least one substrate of the two substrates is formed.

The liquid crystal panel has four sides, three sides are formed with end surfaces of the two substrates being aligned, the first substrate extends outward from the second substrate to form an external connection portion, and at the one side where the external connection portion is formed, wires that electrically interconnect connection terminals outside the seal material and pixel portions inside the seal material are formed and a protective film is formed covering the wire.

In the vicinity of the position where the seal material of the at least one substrate of the two substrates is formed, the thickness of the protective film covering the wires is thinner than the thickness of the protective film covering the pixel portions to form a step portion, and a surface whose affinity is low with respect to the orientation film is formed on the step portion.

BRIEF DESCRIPTION OF THE DRAWINGS

FIG. 13 is a general diagram showing a method of applying an orientation film of the liquid crystal display device that is an embodiment of the present invention.

DETAILED DESCRIPTION OF THE INVENTION

Figure 1:
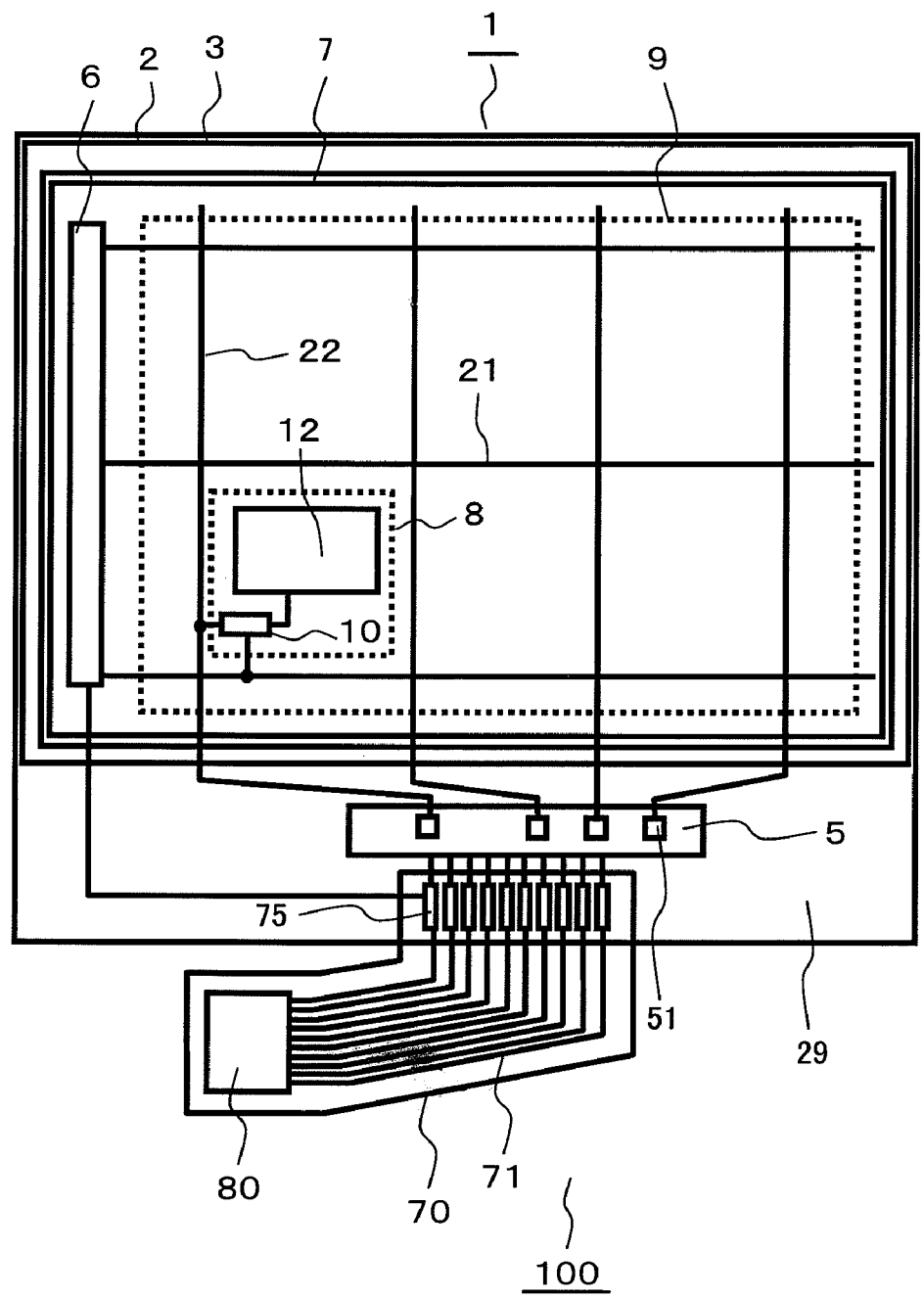
FIG. 1 is a block diagram showing the general configuration of a liquid crystal display device that is an embodiment of the present invention.

FIG. 1 is a plan diagram showing a liquid crystal display device 100 according to the present invention. The liquid crystal display device 100 is configured by a liquid crystal panel 1 and a control circuit 80. Signals and a power supply voltage needed for the display of the liquid crystal panel 1 are supplied from the control circuit 80. The control circuit 80 is mounted on a flexible substrate 70, and the signals are transmitted to the liquid crystal panel 1 via wires 71 and terminals 75.

Pixel electrodes 12 are disposed in pixel portions 8 of the liquid crystal panel 1. It will be noted that although the liquid crystal panel 1 is disposed with a large number of the pixel portions 8 in a matrix, just one pixel portion 8 is shown in FIG. 1 in order to avoid the drawing becoming complicated. The pixel portions 8 arranged in a matrix form a display region 9, with each of the pixel portions 8 fulfilling the role of a pixel of a display image, and display an image in the display region 9.

In FIG. 1, the liquid crystal panel 1 is disposed with gate signal lines (also called scan lines) 21 that extend in the x direction in the drawing and are disposed adjacent to each other in the y direction and drain signal lines (also called video signal lines) 22 that extend in the y direction and are disposed adjacent to each other in the x direction. The pixel portions 8 are formed in regions surrounded by the gate signal lines 21 and the drain signal lines 22.

Switching elements 10 are disposed in the pixel portions 8. Control signals are supplied from the gate signal lines 21 and the switching ON and OFF of the switching elements 10 is controlled. When the switching elements 10 are switched ON, video signals transmitted via the drain signal lines 22 are supplied to the pixel electrodes 12. The pixel electrodes 12 are formed by a transparent conductive film such as ITO.

The drain signal lines 22 are connected to a drive circuit 5 via connection terminals 51. The video signals are outputted from the drive circuit 5 to the drain signal lines 22. The gate signal lines 21 are connected to a drive circuit 6 and the control signals are outputted from the drive circuit 6. The gate signal lines 21, the drain signal lines 22 and the drive circuit 6 are formed on a same TFT substrate 2. The drive circuit 5 is an IC chip and is mounted on the TFT substrate 2.

The TFT substrate 2 is superposed with an opposing substrate 3 via an extremely small clearance. Further, a seal material 7 is disposed on the outer periphery of the display region 9 to adhere the TFT substrate 2 and the opposing substrate 3 to each other. The TFT substrate 2, the opposing substrate 3 and the seal material 7 have the shape of a vessel including an extremely small clearance, and a liquid crystal composition is held inside. It will be noted that color filters (not shown) are disposed on the opposing substrate 3.

Figure 2:
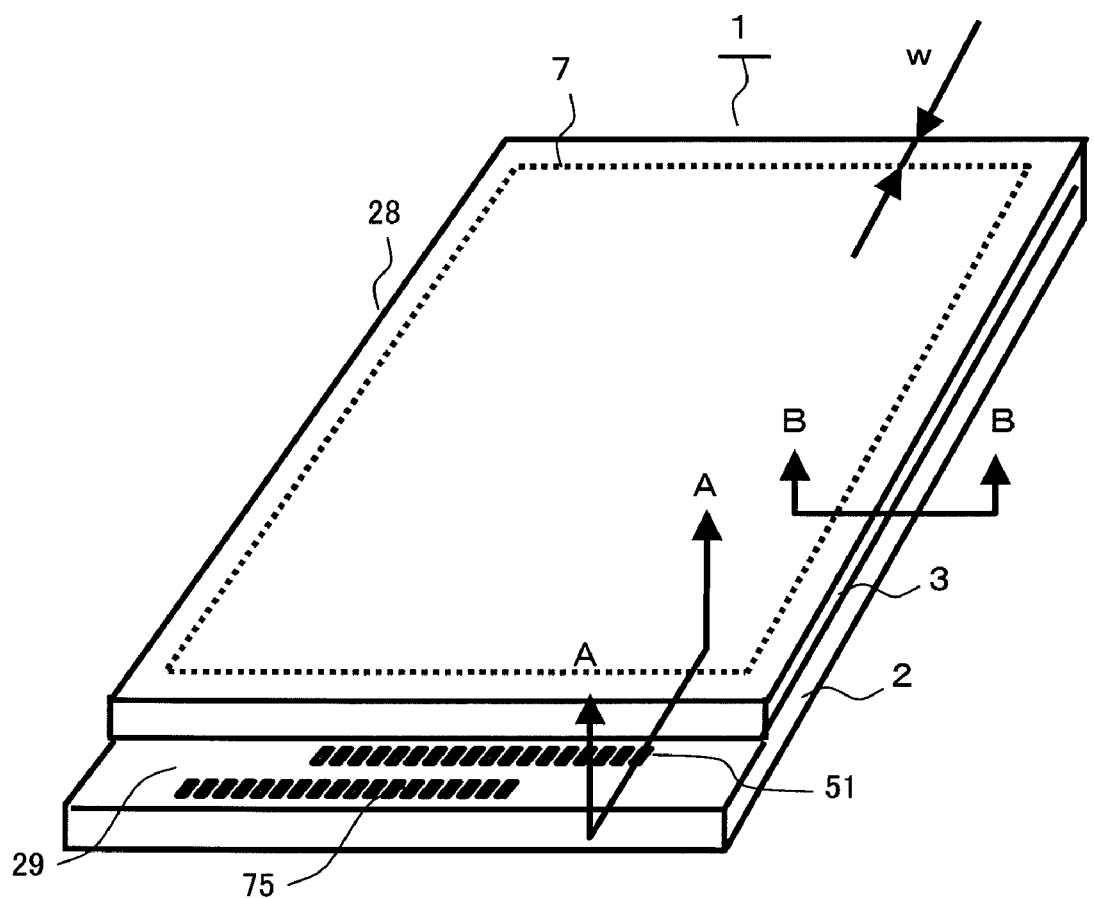
FIG. 2 is a perspective diagram showing the general configuration of a liquid crystal panel of the liquid crystal display device that is an embodiment of the present invention.

Next, the exterior of the liquid crystal panel 1 will be described using FIG. 2. FIG. 2 is a perspective diagram of the liquid crystal panel 1, and as mentioned previously the opposing substrate 3 is superposed on the TFT substrate 2. The TFT substrate 2 and the opposing substrate 3 have a shape where their end surfaces are aligned at three sides 28 and, at the remaining one edge, the TFT substrate 2 projects further outward than the opposing substrate 3 to form a terminal connection portion 29. The connection terminals 51 and the connection terminals 75 are disposed on, and the drive circuit 5 and the flexible substrate 70 are connected to, the terminal connection portion 29 where the TFT substrate 2 extends outward from the side of the opposing substrate 3.

At the three sides 28 where the end faces are aligned, the seal material 7 is formed in the vicinity of the end face, and a clearance w between the seal material 7 and the end sides 28 is narrow. Next, a cross-sectional diagram indicated by section line A-A in FIG. 2 is shown in FIG. 3, and a cross-sectional diagram indicated by section line B-B in FIG. 2 is shown in FIG. 4.

Figure 3:
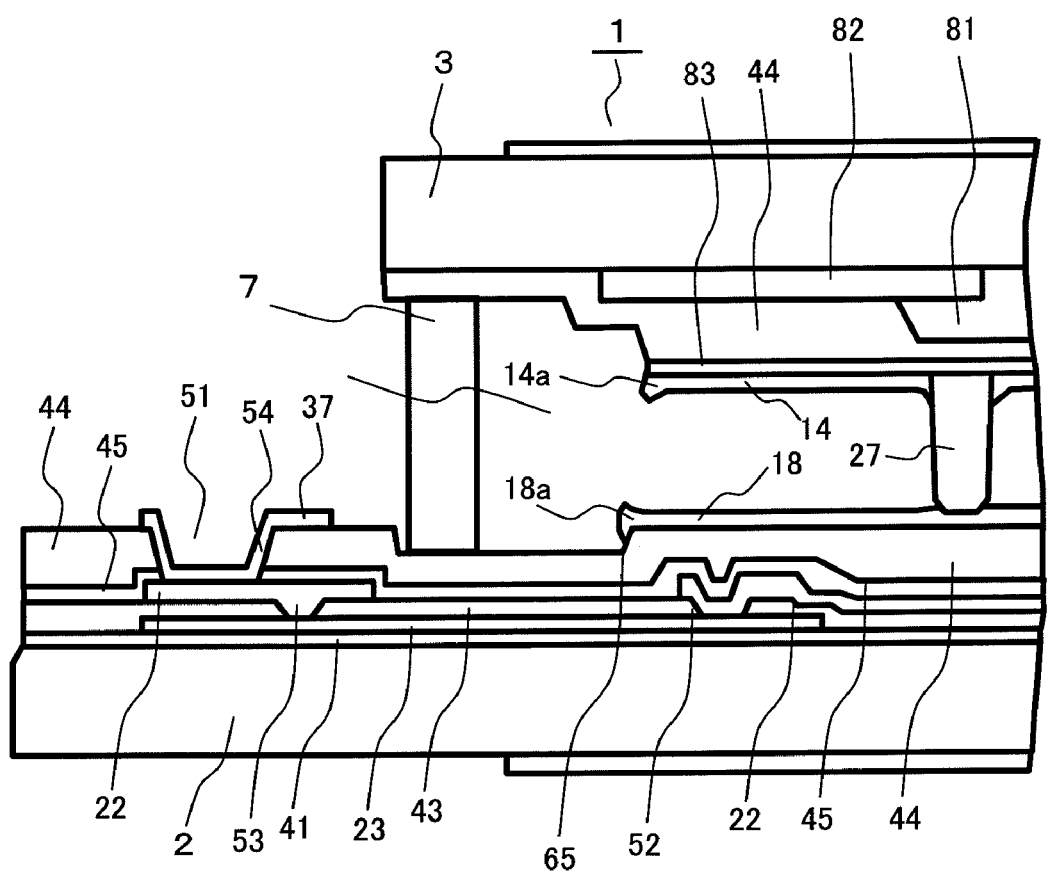
FIG. 3 is a cross-sectional diagram showing the general configuration of the liquid crystal display device that is an embodiment of the present invention.
Figure 4:
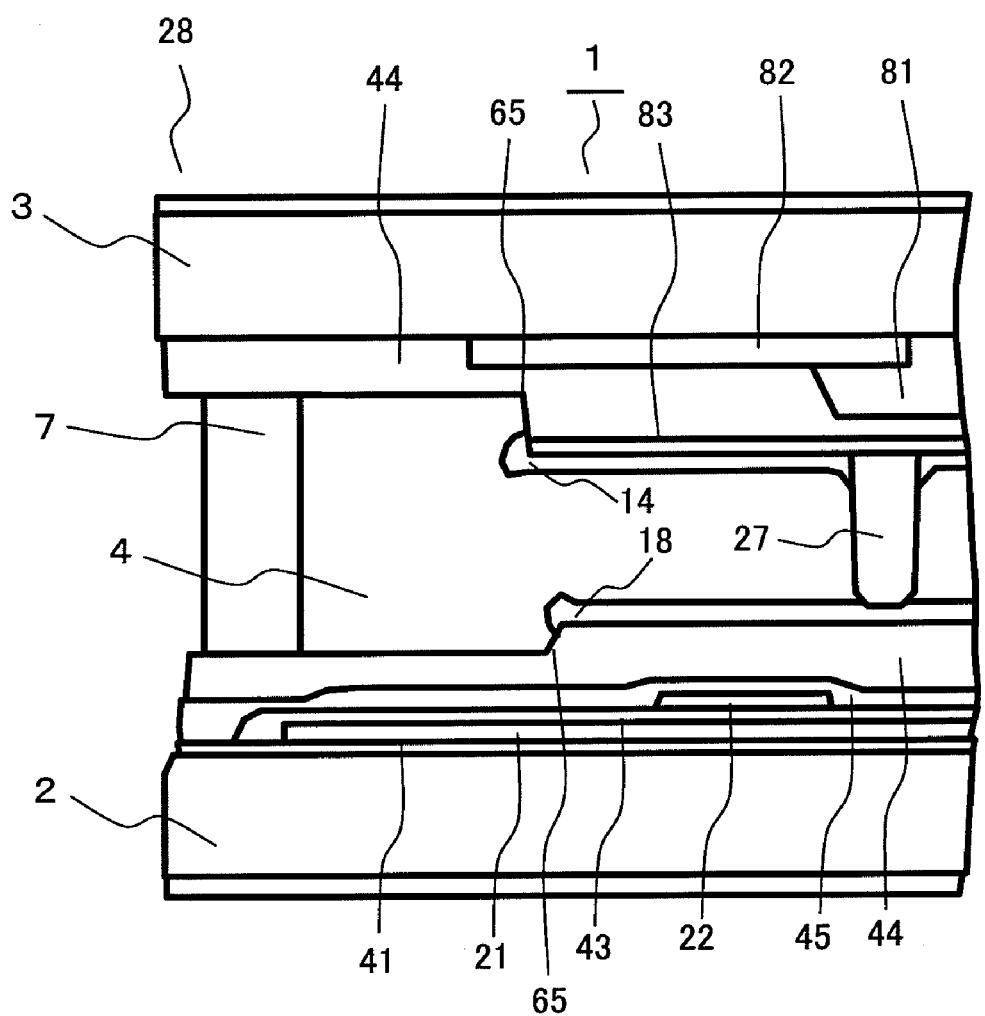
FIG. 4 is a cross-sectional diagram showing the general configuration of the liquid crystal display device that is an embodiment of the present invention.

FIG. 3 is a cross-sectional diagram showing the vicinity of the seal material 7 on the terminal connection portion 29 side. As shown in FIG. 3, the TFT substrate 2 and the opposing substrate 3 are superposed, and the TFT substrate 2 and the opposing substrate 3 are fixed by the seal material 7. Further, a liquid crystal composition 4 is held inside the portion surrounded by the TFT substrate 2, the opposing substrate 3 and the seal material 7. The clearance between the TFT substrate 2 and the opposing substrate 3 is maintained by spacers 27.

A under coat film 41 is formed on the TFT substrate 2, and lead wires 23 formed by the same process as the gate signal lines are formed on the under coat film 41. A gate insulating film 43 is formed on the lead wires 23. The drain signal lines 22 extend as far as the vicinity of the seal material 7 from the display region on the right side of the diagram.

The drain signal lines 22 are connected to the lead wires 23 via through holes 52 formed in the gate insulating film 43 on the inner side of the seal material 7. The lead wires 23 are connected to the drain signal lines 22 via through holes 53 on the outer side of the seal material 7.

An inorganic insulating film 45 and an organic insulating film 44 are laminated on the drain signal lines 22. On the outer side of the seal material 7, through holes 54 are formed in the inorganic insulating film 45 and the organic insulating film 44. The drain signal lines 22 are connected to a transparent conductive film 37 via the through holes 54 to form the connection terminals 51.

In FIG. 3, the seal material 7 is adhered to the organic insulating film 44 on the TFT substrate 2 side. The thickness of the organic insulating film 44 to which the seal material 7 is adhered is thinner than the thickness of an organic insulating film 44 formed in a pixel region by a step 65. It will be noted that it is also possible to remove the organic insulating film 44 at the portion where it is adhered to the seal material 7 and adhere the seal material 7 to the inorganic insulating film 45. The adhesive strength of the seal material 7 increases when the inorganic insulating film 45 is formed by a silicon nitride (SiN) film or a silicon oxide (SiO2) film.

End portions 14a and 18a of orientation films 14 and 18 are formed on the inner side of the seal material 7. When the orientation film 14 or the orientation film 18 and the seal material 7 are superposed, it is possible to avoid the problem of the adhesive strength dropping. It will be noted that the film thicknesses of the orientation films are thicker at the end portions 14a and 18a, and the end portions 14a and 18a have projecting shapes as shown in FIG. 3.

The end portions 14a and 18a of the orientation films are formed in the vicinities of the steps 65 of the organic insulating films 44. The end portions 14a and 18a are formed in the vicinities of the steps 65 so that spreading of the orientation films 14 and 18 is limited by these steps 65.

A black matrix 82 that blocks unnecessary light and a color filter 81 are disposed on the opposing substrate 3. An organic insulating film 44 is disposed so as to cover the black matrix 82 and the color filter 81. The organic insulating film 44 is also called an overcoat and also has the role of filling and planarizing a step that arises because of the color filter 81. Further, it is also possible to use a resist material to form the color filter 81 on the organic insulating film 44.

Further, sometimes a transparent conductive film 83 is also disposed on the liquid crystal side of the organic insulating film 44. The transparent conductive film 83 is an opposing electrode disposed on the opposing substrate 3 and generates an electric field between itself and the pixel electrodes disposed on the TFT substrate 2. Moreover, the spacers 27 are formed by an organic resin or the like on the liquid crystal side of the transparent conductive film 83. It will be noted that although the organic insulating film 44 is described as an example of a protective film in which the step 65 is formed, it is also possible to use the inorganic insulating film 45.

Next, a cross-sectional diagram of the vicinity of the sides 28 where the end surfaces of the TFT substrate 2 and the opposing substrate 3 are aligned is shown in FIG. 4. As shown in FIG. 4, at the sides 28, the TFT substrate 2 and the opposing substrate 3 are cut at a position where they are aligned.

The drain signal lines 22, the organic insulating films 44, the orientation film 14 and the orientation film 18 are formed in proximity to, but do not reach, the seal material 7. In contrast, the gate signal lines 21, the gate insulating film 43 and the inorganic insulating film 45 reach the seal material 7, and part of each overlaps the seal material 7.

It is possible to form the gate signal lines 21, the gate insulating film 43, the drain signal lines 22, the inorganic insulating film 45 and the organic insulating films 44 by the photolithographic process with high precision. However, the orientation film 14 and the orientation film 18 are formed by printing or the inkjet method, and the precision is lower than the photolithographic process. For that reason, when the orientation film 14 and the orientation film 18 are formed in the vicinity of the seal material 7, a problem occurs where part of each of the orientation film 14 and the orientation film 18 overlaps the seal material 7 because of manufacturing variations and the like.

Positional precision resulting from printing the orientation film 14 or the orientation film 18 is ±0.45 mm, and positional precision of printing and a dispenser to form the seal material 7 is about ±0.15 mm. For that reason, a maximum variation of 0.70 mm occurs. Thus, when the distance between the end portion of the orientation film 14 or the orientation film 18 and the seal material 7 becomes equal to or less than 0.70 mm, the potential arises for the orientation film 14 or the orientation film 18 and the seal material 7 to overlap.

That is, assuming that SW represents the width of the seal material 7 and that M represents the positional precision of the orientation films and the seal material, when the end portions of the orientation films are formed within a distance of SW+M from the end side of the TFT substrate 2 and the opposing substrate 3, the positional precision of the orientation films formed by printing or the inkjet method deteriorates, and so the orientation film 14 or the orientation film 18 and the seal material 7 overlap.

For that reason, the steps 65 are formed in the organic insulating films 44 to prevent the orientation films 14 and 18 from spreading at the portions where the film thickness of the steps 65 is thick.

Figure 5A:
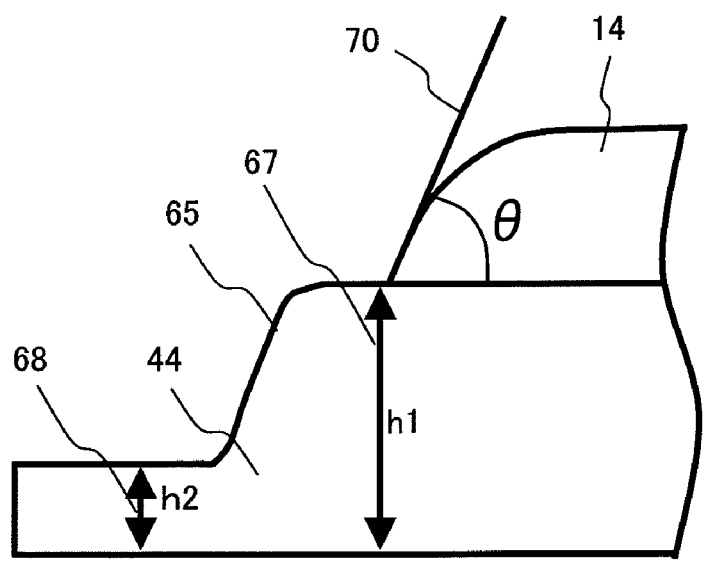
FIGS. 5A and 5B are cross-sectional diagrams showing a step portion of the liquid crystal display device that is an embodiment of the present invention.
Figure 5B:
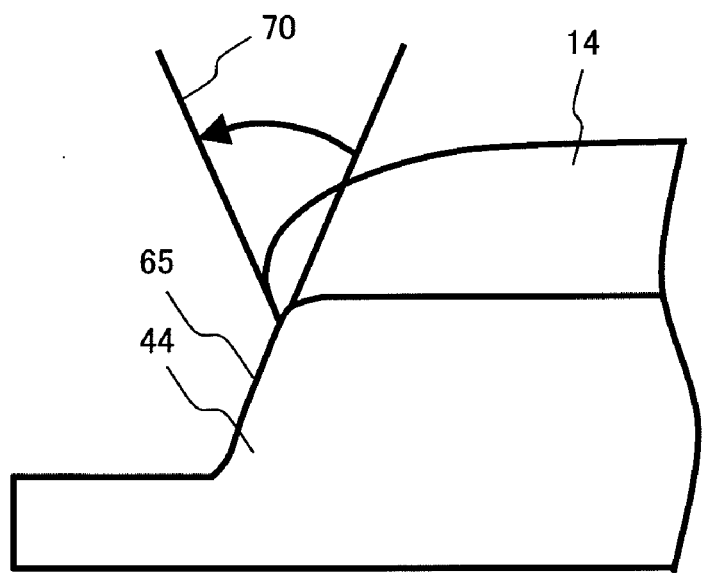

Next, the position where the orientation film spreads when the step 65 is formed in the organic insulating film 44 will be described using FIGS. 5A and 5B. A first thickness portion 67 with a thickness h1 and a second thickness portion 68 with a thickness h2 are formed on the organic insulating film 44, whereby the step 65 is formed.

When the orientation film 14 is applied to the first thickness portion 67, the orientation film 14 spreads on the surface of the organic insulating film 44. When the surface of the organic insulating film 44 is flat, the contact angle θ between the orientation film 14 and the organic insulating film 44 is constant. It will be noted that the contact angle θ is indicated in FIGS. 5A and 5B by a tangent 70 in order to make the drawings easier to understand.

When the orientation film 14 reaches the step 65 of the organic insulating film 44, the contact angle θ between the orientation film 14 and the organic insulating film 44 spreads at the step portion 65. At this time, because of the surface tension of the orientation film 14, force works such that the contact angle does not spread. For that reason, the spreading of the orientation film decreases or stops at the step portion 65.

The step portion 65 can be formed by half-exposing a light-curing resin by the photolithographic process and can be formed without steps such as replacing an exposure-use mask or reapplying resin increasing.

The second thickness portion 68 of the organic insulating film 44 weakens the amount of light exposure in comparison to the first thickness portion 67 and is easier to remove by ashing or the like. For that reason, more of the organic insulating film 44 is removed at the second thickness portion 68 in comparison to the first thickness portion 67 by exposing/developing and ashing the organic insulating film 44, so the step portion 65 is formed.

Figure 6:
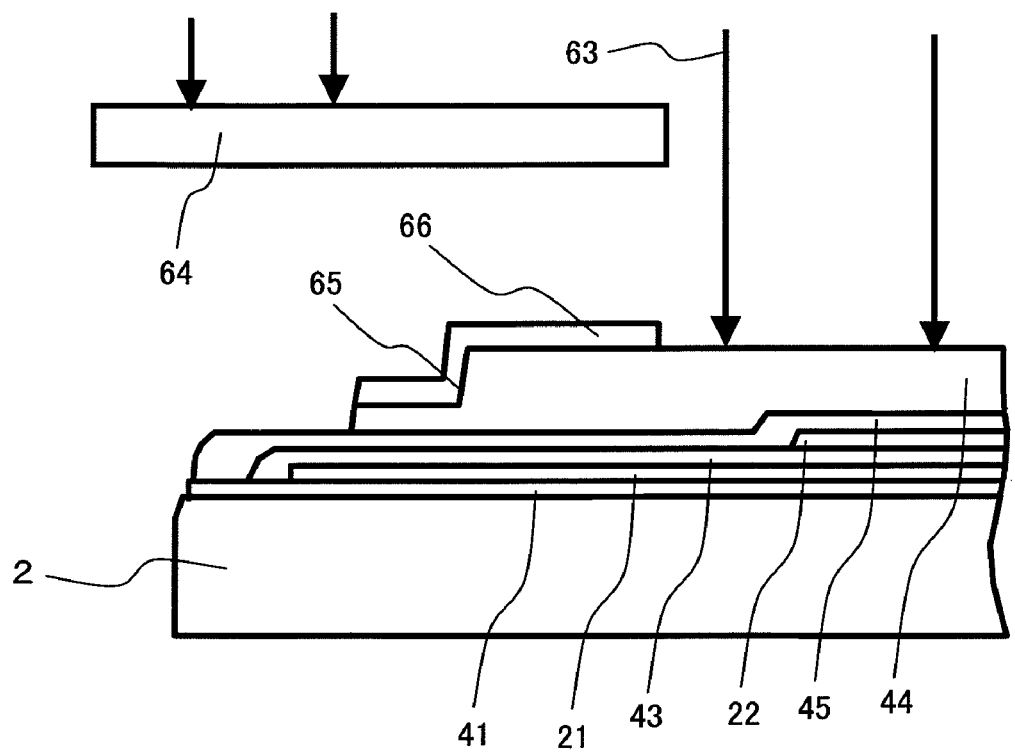
FIG. 6 is a cross-sectional diagram showing the general configuration of the liquid crystal display device that is an embodiment of the present invention.

Next, a structure where the film coatability of the step portion 65 has been further lowered will be described using FIG. 6. FIG. 6 shows the TFT substrate 2 side of the end side 28. As shown in FIG. 6, a transparent conductive film 66 is formed on the step portion 65 to lower the film coatability. Similar to that used for the pixel electrodes, the transparent conductive film 66 is configured from a translucent conductive layer such as ITO (indium tin oxide), ITZO (indium tin zinc oxide), IZO (indium zinc oxide), ZnO (zinc oxide), SnO (tin oxide) and In2O3 (indium oxide). The film coatability drops because the affinity of the transparent conductive film 66 with the solvent included in the orientation film is low in comparison to the organic insulating film 44.

Moreover, the organic insulating film 44 is irradiated with ultraviolet light 63 using the step portion 65 as a boundary. The affinity (wettability) of the organic insulating film 44 irradiated with the ultraviolet light 63 with the solvent included in the orientation film becomes better and the film coatability improves.

In contrast, the transparent conductive film 66 is covered by a mask 64 and is not irradiated with the ultraviolet light 63. Because the transparent conductive film 66 is not irradiated with the ultraviolet light 63, an improvement in the film coatability does not occur in the region outside the transparent conductive film 66. For that reason, the film coatability of the transparent conductive film 66 not irradiated with the ultraviolet light 63 drops also with respect to the transparent conductive film in the pixel region irradiated with the ultraviolet light 63.

Figure 7:
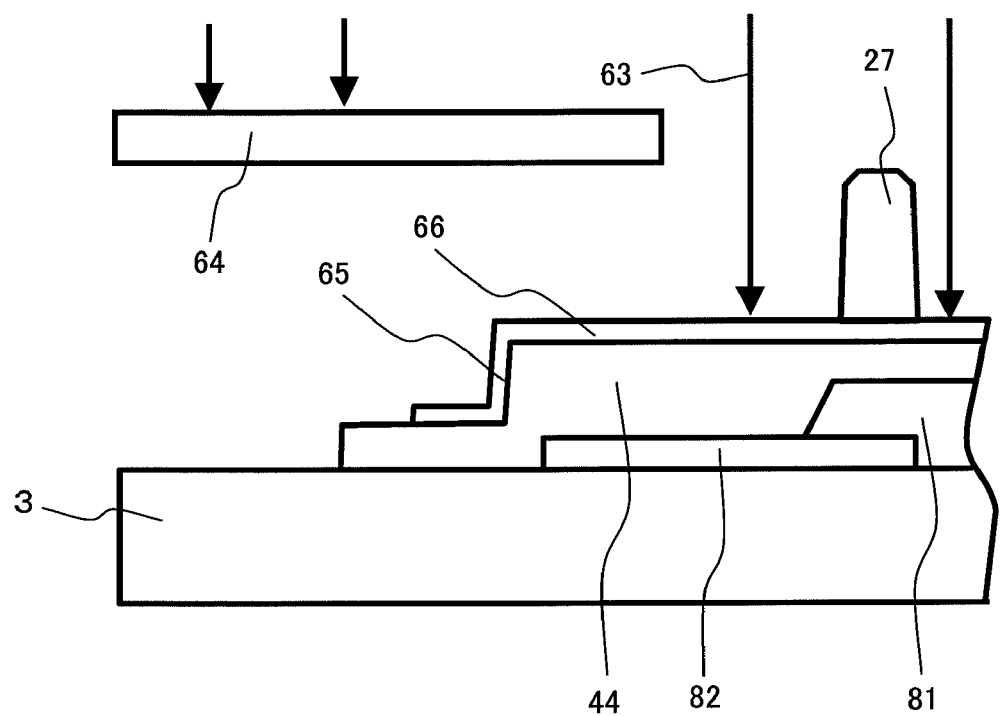
FIG. 7 is a cross-sectional diagram showing the general configuration of the liquid crystal display device that is an embodiment of the present invention.

Next, the opposing substrate 3 side of the end edge 28 is shown in FIG. 7. Sometimes the transparent conductive film 66 is formed as an opposing electrode on substantially the entire surface of the organic insulating film 44 on the opposing substrate 3 side, and the transparent conductive film 66 is also formed on the step portion 65. However, the transparent conductive film 66 is irradiated with the ultraviolet light 63 using the step portion 65 as a boundary. The affinity of the transparent conductive film 66 irradiated with the ultraviolet light 63 with the solvent included in the orientation film becomes better and the film coatability improves.

It will be noted that the opposing substrate 3 shown in FIG. 7 has a structure where the organic insulating film 44 has been removed at the portion where it is adhered to the seal material 7. It is preferable to form the organic insulating film 44 even if it is thin, because the lead wires and gate wires that connect to the connection terminals are disposed under the portion where the organic insulating film 44 is adhered to the seal material 7 on the TFT substrate 2 side, but it is also possible to remove the organic insulating film 44 at the portion where it is adhered to the seal material 7 of the opposing substrate 3 to obtain adhesive strength.

Figure 8:
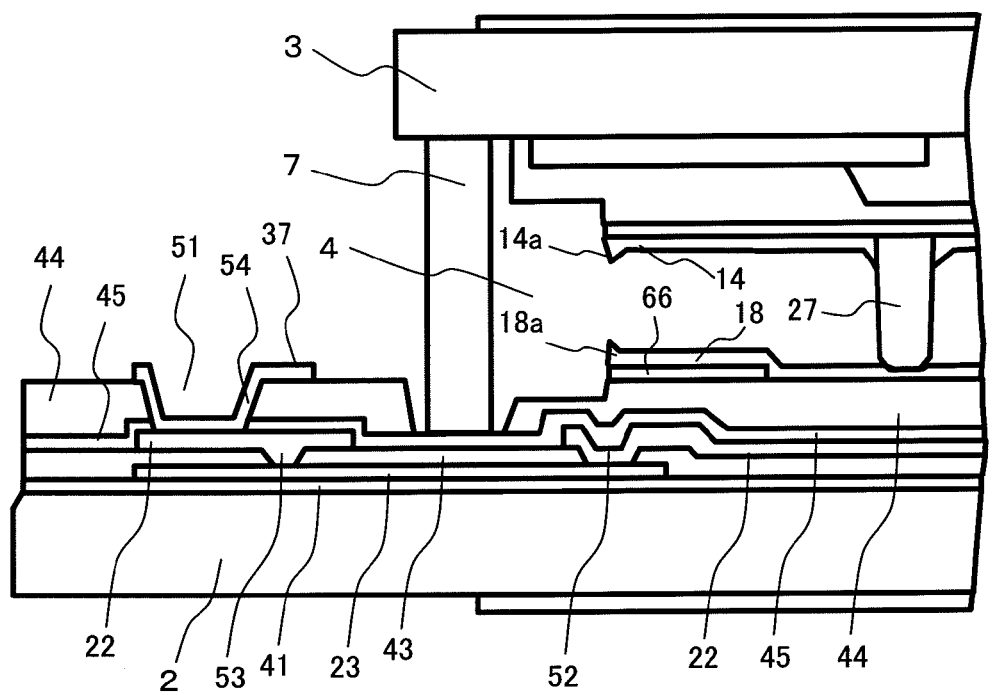
FIG. 8 is a cross-sectional diagram showing the general configuration of the liquid crystal display device that is an embodiment of the present invention.
Figure 9:
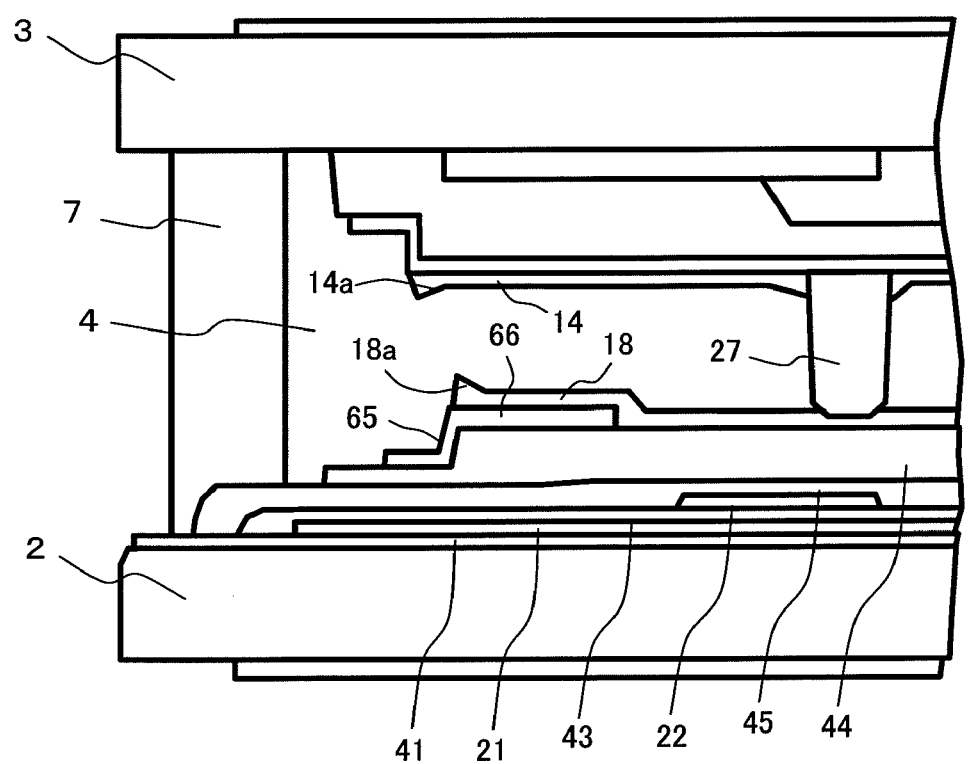
FIG. 9 is a cross-sectional diagram showing the general configuration of the liquid crystal display device that is an embodiment of the present invention.

FIG. 8 is a cross-sectional diagram showing the vicinity of the seal material 7 on the terminal connection portion 29 side, and the transparent conductive film 66 is disposed in the vicinity of the step 65. Further, FIG. 9 is a cross-sectional diagram of the vicinity of the side 28 where the end surfaces of the TFT substrate 2 and the opposing substrate 3 are aligned, and shows a state where the transparent conductive film 66 is disposed in the vicinity of the step 65 and the orientation films 14 and 18 are applied and fired. The orientation films 14 and 18 end at the steps 65 because the affinity of the transparent conductive film 66 with the orientation films 14 and 18 is low.

It will be noted that the adhesive strength of the seal material 7 also drops when it is not irradiated with the ultraviolet light 63, but because the adhesive strength of the seal material 7 is about twice as high in comparison to the orientation films, the affect of a drop in adhesive strength extending to the seal material 7 as a result of not being irradiated with the ultraviolet light 63 is small in comparison to the ease of peeling away resulting from the orientation films.

In FIG. 8 and FIG. 9, the portion of the organic insulating film 44 where its film thickness is thin is formed as far as the vicinity of the adhered portion of the seal material 7, but the organic insulating film 44 is removed at the portion where it is adhered to the seal material 7, so the seal material 7 is adhered to the inorganic insulating film 45 or the opposing substrate 3. When the adhesive strength of the seal material 7 is raised in this manner, removing the organic insulating film 44 is also effective at the portion adhered to the seal material 7 of both the TFT substrate 2 and the opposing substrate 3.

Figure 10:
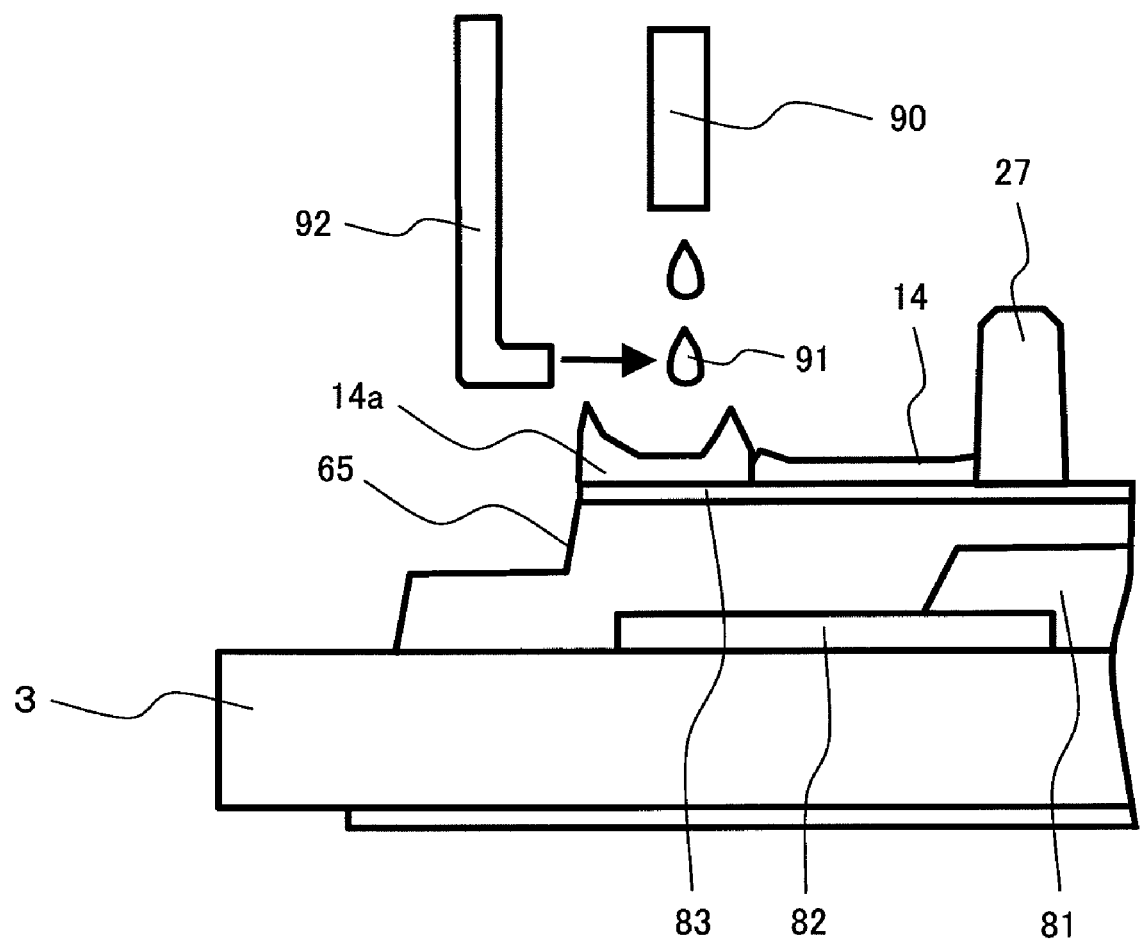
FIG. 10 is a general diagram showing a method of applying an orientation film of the liquid crystal display device that is an embodiment of the present invention.

Next, methods of adjusting the viscosity of the orientation film liquid will be described using FIG. 10 to FIG. 13. In this description, the coating liquid that is applied and thereafter dried and fired to form the orientation film will also be called the orientation film 14 or the orientation film liquid 14. FIG. 10 shows a configuration in the vicinity of a nozzle 90 when applying the orientation film liquid using the inkjet method. The orientation film liquid is applied to the opposing substrate 3 as liquid droplets 91 from the nozzle 90.

The viscosity of the orientation film 14 applied by the inkjet method is low and the orientation film 14 easily spreads on the opposing substrate 3. For that reason, a blower nozzle 92 is disposed in proximity to the nozzle 90 to blow warm air or cool air onto the dripping orientation film liquid. The solvent vaporizes and the viscosity of the liquid droplets 91 becomes higher because of the warm air or cool air discharged from the blower nozzle 92, and the liquid droplets 91 are applied to the opposing substrate 3.

The orientation film 14a whose viscosity is high collects in the vicinity of the step portion 65, whereby it becomes possible to control spreading of the orientation film 14. It will be noted that a projection forms between the orientation film 14a whose viscosity is high and the orientation film 14 whose viscosity is low because the peripheral portion of the orientation film 14a has a projecting shape after the solvent evaporates. Further, as shown in FIG. 10, forming the film thickness of the orientation film 14a whose viscosity is high to be thicker than the film thickness of the orientation film 14 formed in another pixel region or forming the projection of the orientation film 14a whose viscosity is high to be higher than the projection or film pressure of the orientation film 14 formed in another pixel region to more reliably prevent spreading of the orientation film 14 are also possible.

Figure 11:
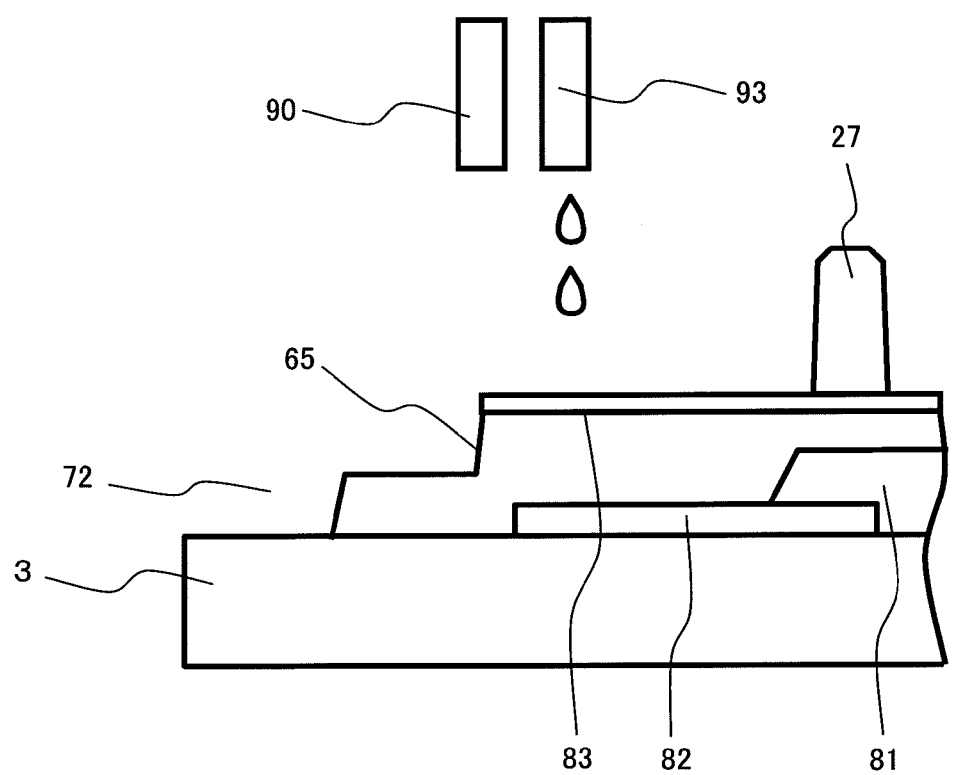
FIG. 11 is a general diagram showing a method of applying an orientation film of the liquid crystal display device that is an embodiment of the present invention.

FIG. 11 shows a mechanism where two nozzles for applying the orientation film are formed, the orientation film liquid 14 whose viscosity is normal is dripped from the nozzle 90, and the orientation film liquid 14a whose viscosity is high is dripped from a nozzle 93.

Figure 12:
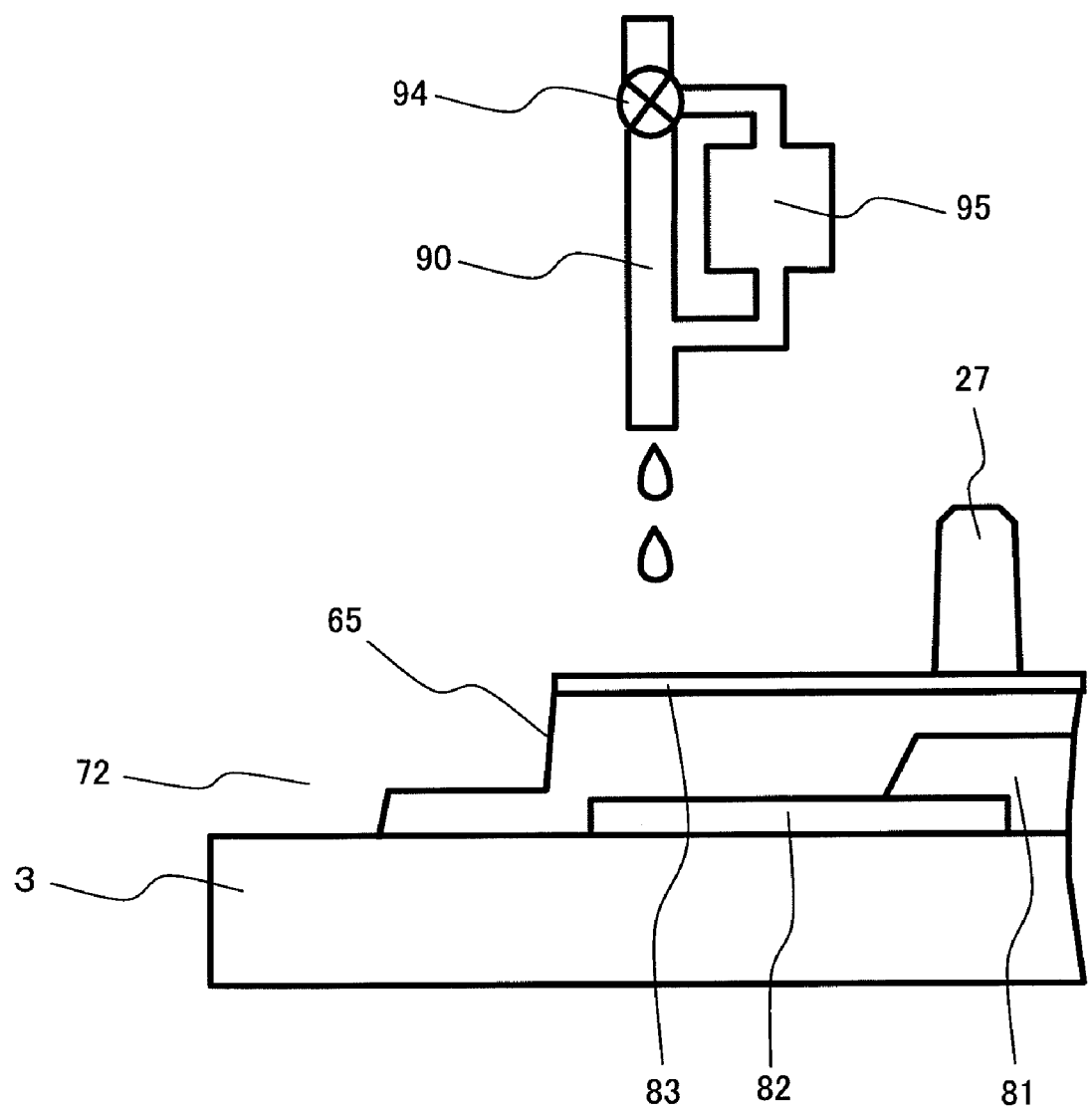
FIG. 12 is a general diagram showing a method of applying an orientation film of the liquid crystal display device that is an embodiment of the present invention.

FIG. 12 shows a mechanism where a valve 94 and a heating/cooling component 95 are disposed on the nozzle 90 and, in the vicinity of the step portion 65, the orientation film liquid is passed through the heating/cooling component 95 by the valve 94 and heated or cooled to raise its viscosity, and the orientation film liquid 14a is dripped onto the opposing substrate 3.

FIG. 13 shows a mechanism where a heating or cooling component 97 is disposed in a position in the vicinity of the step portion 65 of a substrate holder 96. The opposing substrate 3 is overheated or cooled at the time the orientation film is dripped, whereby it becomes possible to adjust the viscosity of the orientation film liquid 14 and raise the viscosity of the orientation film liquid 14a applied in the vicinity of the step portion 65.

What is claimed is:

1. A liquid crystal display device comprising:
   a first substrate;
   a second substrate;
   a display region disposed in the first substrate;
   a seal material disposed above a sealing region formed in proximity to the display region;
   a protective film formed above the first substrate or the second substrate, including a display region and a sealing region; and
   an orientation film formed on the protective film,
   wherein a step portion is formed on an inner side of the protective film partitioned by the seal material, and the display region of the protective film is thicker than a thickness of the sealing region of the protective film.

2. The liquid crystal display device according to claim 1, wherein a film whose affinity with the orientation film is low in comparison to the protective film is disposed on the step portion.

3. The liquid crystal display device according to claim 1, wherein a transparent conductive film is disposed on the step portion.

4. A liquid crystal display device comprising:
a first substrate;
a second substrate;
pixel portions disposed on the first substrate;
color filter portions disposed on the second substrate;
a seal material disposed above a sealing region of the first substrate and the second substrate; and
an orientation film formed above at least one of the first substrate and the second substrate,
wherein at a side where connection terminals of the first substrate are formed, wires are formed that electrically interconnect the connection terminals and the pixel portions under the seal material,
an organic insulating film disposed above the wires,
a step portion having a first film and a second film, wherein a thickness of the second film is thinner than a thickness of the first film, and the second film is formed on an end portion of an inner side of the first film partitioned by the seal material, and
an end portion of the second film is formed on the first film.

5. The liquid crystal display device according to claim 4, wherein a film whose affinity with the orientation film is low in comparison to the organic insulating film is disposed on the step portion.

6. The liquid crystal display device according to claim 4, wherein a transparent conductive film is disposed on the step portion.

7. A liquid crystal display device comprising:
a first substrate;
a second substrate;
a display region disposed in the first substrate;
a seal material disposed around the display region;
a protective film formed above one at least one of the first substrate and the second substrate, including a display region and a step region; and
an orientation film formed on the protective film,
wherein a step portion is formed on an inner side of the protective film partitioned by the seal material, and
a thickness of the orientation film formed on the step portion is thicker in comparison to a thickness of the orientation film formed on the display region.

8. The liquid crystal display device according to claim 7, wherein a projecting portion is disposed on the orientation film between the orientation film disposed on the step portion and the orientation film formed on the display region.

9. The liquid crystal display device according to claim 7, wherein a transparent conductive film is disposed on the step portion.

10. The liquid crystal display device according to claim 7, wherein the thickness of the orientation film formed in an end portion is thicker than a thickness of the remainder of the orientation film.

* * * * *